March 31, 1964 R. J. BROADWELL 3,127,158
VEHICLE SUSPENSION STRUT ASSEMBLY
Filed April 25, 1962 2 Sheets-Sheet 1
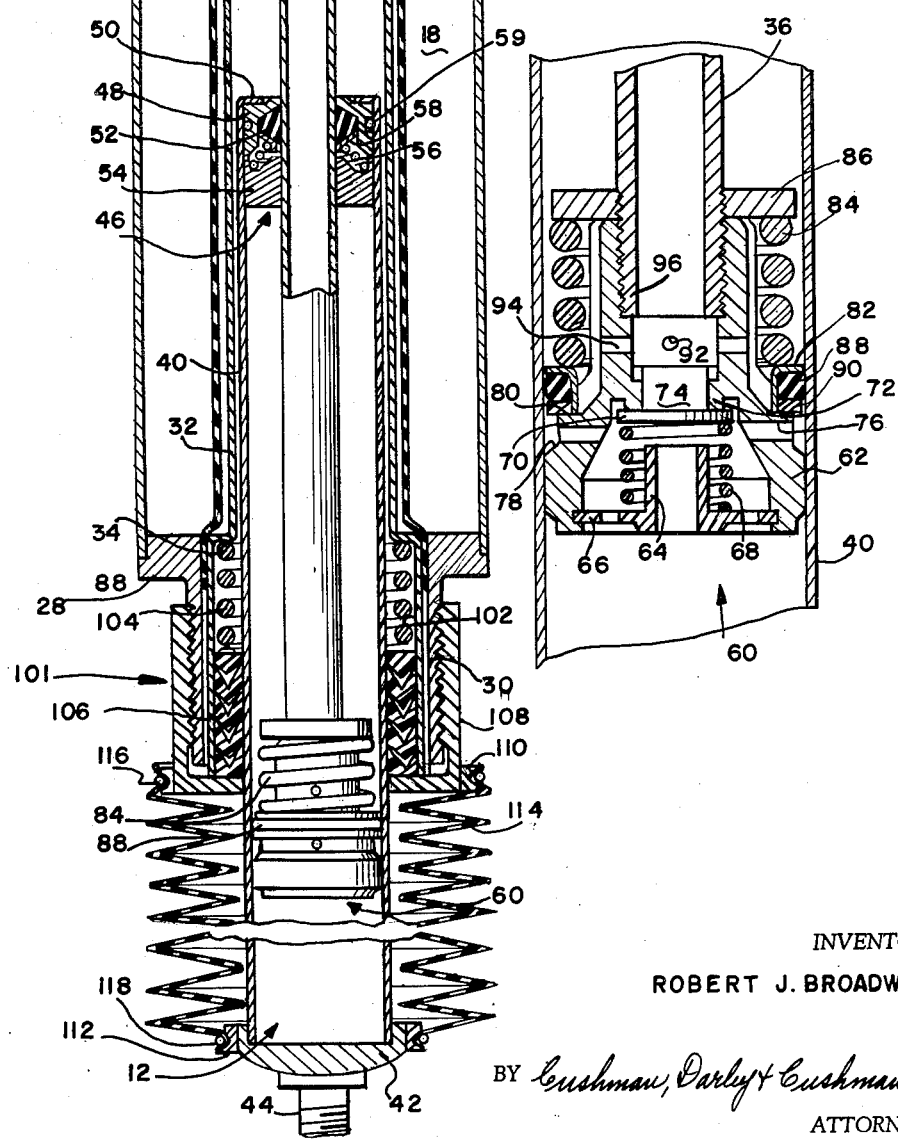
INVENTOR
ROBERT J. BROADWELL
BY Cushman, Darby & Cushman
ATTORNEY

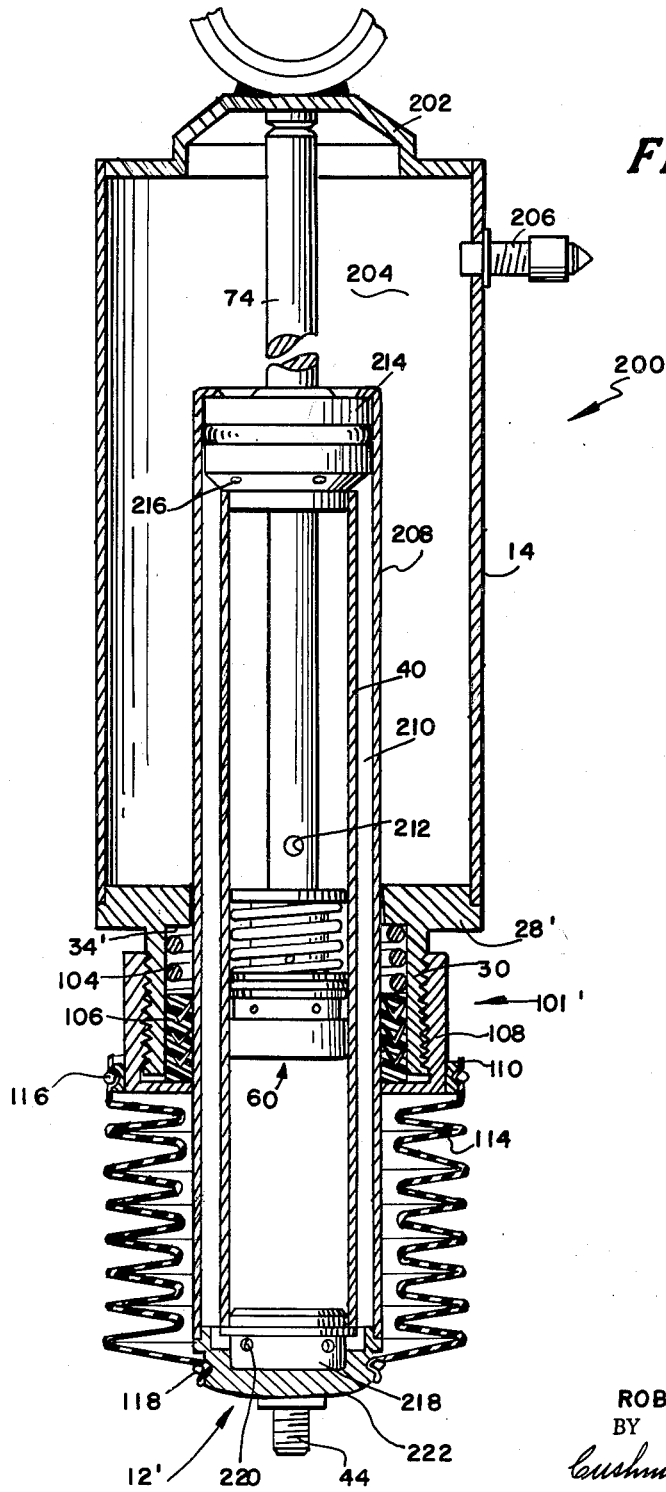

United States Patent Office 3,127,158
Patented Mar. 31, 1964

3,127,158
VEHICLE SUSPENSION STRUT ASSEMBLY
Robert J. Broadwell, Cleveland, Ohio, assignor, by mesne assignments, to Maremont Corporation, Chicago, Ill., a corporation of Illinois
Filed Apr. 25, 1962, Ser. No. 190,107
7 Claims. (Cl. 267—64)

This invention relates to hydro-pneumatic suspension strut assemblies for vehicles, of the type disclosed in my copending applications, Serial No. 850,957, filed November 14, 1959, now Patent No. 3,083,026 issued March 26, 1963, and Serial No. 859,613, filed December 15, 1959.

In the applications, of which the present application is a continuation-in-part, there are disclosed new and improved means for suspending the sprung and unsprung mass of a vehicle to provide additional support for the rear axles, and load levelling means for maintaining the unsprung mass of the vehicle at a predetermined level with respect to the ground. These applications disclose various hydro-pneumatic, pump damper assemblies and air springs integral therewith, together with fluid circuits and associated mechanism for obtaining new and improved vehicle suspension. In such prior art, the pump damper assembly or shock absorber carries a piston and rod assembly within a cylindrical tube; and, surrounding the shock absorber assembly is an outer casing which forms an air spring with a resilient cylindrical sleeve. The shock absorber assembly is mounted for longitudinal movement with respect to the resilient wall, and these elements are maintained in sealed engagement with one another by a folded, flexible sleeve which allows movement of the elements with respect to the other while maintaining a fluid tight seal therebetween.

While such prior art assemblies have enjoyed considerable success, the provision of a flexible folded sleeve type seal to maintain the elements in fluid tight engagement while allowing relative longitudinal movement therebetween, has significant shortcomings. The folded sleeve sealing means of this prior art is difficult to maintain fluid tight and assembly of the units is a relatively expensive and difficult task.

Accordingly, it is an object of the present invention to provide new and improved sealing means for a dual-fluid strut and pump damper assembly between the pump damper or shock absorber and an air spring assembly mounted in telescoping relationship therewith.

Another object of the present invention is to provide a shock absorber including a movable cylindrical tube having a valved piston and rod assembly carried therein, an outer casing having a cylindrical resilient wall joined thereto in spaced apart relationship, and new and improved means for maintaining a fluid tight seal between the movable cylindrical tube carrying the above shock absorber elements, the lower end of the resilient wall, and the surrounding outer casing. Accordingly, there is provided a threaded barrel receiving the shock absorber, an intermediate tube carrying the bottom end of the resilient wall in gripping engagement with the barrel, the intermediate tube having a circumferential shoulder providing an enlarged space between the interior surface thereof and the exterior surface of shock absorber cylinder. Mounted within this enlarged cylindrical space is a compression spring; and, chevron packing, preferably of "Teflon," is carried in abutting relationship with the compression spring; and the entire assembly is closed by a cap engaged with the barrel and which surrounds the shock absorber cylinder.

These and further objects, advantages, and novel features of the present invention will become apparent in the specification and claims taken with the accompanying drawings.

In the drawings:

FIGURE 1 is a longitudinal section view of a suspension strut assembly;

FIGURE 2 is an enlarged section view of the shock absorber piston shown in FIGURE 1; and FIGURE 3 is a longitudinal sectional view of a suspension strut assembly, according to a modified embodiment of the present invention.

Referring now to FIGURE 1, there is shown a combined self-levelling, hydro-pneumatic strut and pump damper assembly 10 having a shock absorber assembly 12 mounted therein, the strut assembly 10 including an exterior tubular outer casing 14 having a sleeve diaphragm 16 of flexible material, preferably rubber or the like, disposed therein and defining an annular air chamber 18.

A closure cap 20 is engaged with and closes the upper end of the outer casing 14, this cap 20 having a central aperture 22. Adjacent the aperture 22 of the cap 20 are integral grooves 24, which grip the adjacent upper end of the sleeve diaphragm 16. Carried adjacent the lower surface of the diaphragm 16 in engagement with the cap 20 is a plug 26 having a counterbored central passage 27.

Joined to the lower end of the outer casing 14, as by welding, is a barrel 28 having a downwardly extending threaded exterior surface 30. Received within this barrel 28 is a tube 32 having a radially extending shoulder 34 adjacent the barrel 28 to provide a gripping of the lower end of the sleeve diaphragm 16, positioned therebetween, thus gripping the diaphragm 16 in a manner similar to the upper portion thereof.

Fixed to the plug 26 within the lower counterbored portion of the passage is a tubular piston rod 36 which, in turn, is slidably received at its lower end within the shock absorber 12. A bored stub shaft 37 is also carried within the counterbored passage 27 within the upper end of the rod 36. This shaft 37 is operatively connected to a fluid source and control system for operation as described in my copending application Serial No. 850,957, now Patent No. 3,083,026.

The shock absorber 12 is longitudinally movable with respect to the piston rod 36. In this regard, the shock absorber 12 includes a cylindrical tube 40, closed at its lower end by an end cap 42. The end cap 42 carries a suitable stud 44 for engagement with the unsprung mass of a vehicle, as is apparent.

The upper end of the tube 40 carries a sealing unit 46 including an end closure cap 48 retained at the upper end of the cylinder by an inwardly turned flange 50 formed on the tube 40. The cap 48 carries a flexible packing ring 52 adjacent its lower surface, which ring surrounds the piston rod 36 and is sealingly pressed against the latter by means of a cupped disk 54, fixed within the tube 40. A tapered compression spring 56 is mounted between the disk 54 and a compression washer 58 abutting the underside of the packing ring 52. An O-ring 59 is carried about the recessed outer periphery of the cap 48 to provide a peripheral seal with the tube 40.

Mounted within the tube 40 in engagement with the piston rod 36 is a valved piston generally indicated at 60 which includes a piston body 62 having a lower hollow portion and is provided with a periphery for engaging the interior of the tube 40. A sleeve 64 is disposed within the hollow portion of the tubular end of the piston body 62 and is secured thereto by an integral apertured disk 66. Surrounding the sleeve 64 is a coil spring 68, one end of which engages the disk 66 and the opposite end of which engages a spring biased valve member 70. The valve member 70 is adapted to engage an annular seat 72 surrounding the central interior passage 74 formed in the piston body. A plurality of circumferentially spaced passages 76 extend between the lower hollow interior of the piston body radially outward to a circumferential groove 78 formed therein. The periphery of the upper portion of the piston body is relieved and provides an annular seat 80 adjacent the annular groove 78.

A carrier 82 of inverted L-shaped configuration in cross section is mounted within the relieved portion of the valve body as by a coil spring 84, one end of which engages the carrier 82 and the other end of which engages a slotted washer 86 secured to the upper extremity of the piston body. Mounted within the outer periphery of the carrier 82 is a flexible O-ring 88, and a flat sealing ring 90. The upper end of the valve body is provided with a bore 92 communicating with the central interior passage 74 and a plurality of circumferentially spaced passages 94 extend radially from the bore 92 to the outer reduced periphery of the valve body. The piston body is longitudinally threaded to receive the cooperatively threaded end 96 of the piston rod 36.

The piston rod 36 has apertures 98 at its upper end adjacent the plug 26; and, the tube 32 has large, longitudinally extending slots 100 adjacent the plug 26.

According to this invention, the shock absorber 12 is sealed with respect to barrel 28 by new and improved sealing means 101. As previously stated, the threaded barrel 28 and tube 32 seal the lower end of the sleeve diaphragm 16, positioned therebetween. By virtue of the provision of a radial shoulder 34 in the tube 32, there is an enlarged annular chamber 102. Carried within this chamber 102 adjacent the shoulder 34 is a compression spring 104. Positioned adjacent the lower end of the compression spring 104 are a plurality of aligned chevron packing rings 106 mounted in longitudinal relationship to one another. These rings 106 are preferably constructed of polytetrafluoroethylene; however, equivalent materials providing an enhanced sealing effect will be apparent to those skilled in the art. A cap 108 has a central aperture for receiving the tube 40 of the shock absorber 12, and is threadably engaged with the exteriorly threaded portion 30 of the barrel 28, thereby providing a tight packing seal between the shock absorber 12 and the remainder of the structure. By virtue of this arrangement, the requirement for a folded sleeve seal is fully and effectively obviated and the entire sealing means 101 is quickly and simply assembled.

Conveniently, the cap 108 carries a ring 110 at its lower end, this ring having a recessed circumferential exterior surface; and, the end cap 42 carries a similar ring 112. A boot of accordian pleated, sleeve construction 114 is joined at its respective upper and lower ends by sprung ring clips 116 and 118 which are received about the respective rings 110 and 112.

It will be appreciated that the sealing means 101 is equally adapted for various types of hydro-pneumatic strut assemblies, the particular shock absorber construction shown in FIGURE 1 and the related elements being of exemplary construction only.

The shock absorber 12 carries hydraulic fluid, while the air chamber 18 is filled by compressed air or the like through a suitable valve (not shown). As the shock absorber 12 moves upwardly, the excessive hydraulic pressure in the lower chamber portion below the piston 60 escapes into the upper chamber (above the piston 60). The hydraulic fluid moves through the passages 76 and thence about the outer periphery of the O-ring 88, due to the fact this excessive hydraulic pressure causes a yielding of the carrier 82. The central passage 74 is, at this time, closed by the valve 70 biased against the seat 76 by the spring 68. This fluid forced into the upper chamber then passes through the passages 94 into the lower end of the piston rod 36, and as the fluid accumulates, it flows under pressure out of the piston rod 36 through the passages 98 and into the enlarged space at the upper end of the unit 10. This hydraulic fluid acts freely against the diaphragm 16 as the pressure is thus built up.

As the shock absorber moves downwardly and the space above the piston 60 is decreased, the excessive hydraulic pressure caused by the diaphragm 14 opens the valve 70 against the action of the spring 68, allowing the lower portion of the cylinder 40 below the piston 60 to be filled.

By virtue of the novel sealing means 101, there is a superior seal between the movable shock absorber 12 and the related assembly. If desired, the piston rod 36 and the valving may be suitably modified to actuate different vehicle suspension systems to provide, e.g., load levelling, and the like.

Referring now to FIGURE 3, there is shown the sealing means 101' incorporated in a combination air spring and shock absorbed assembly 200 of the type described in my application Serial No. 190,106, filed April 25, 1962, and entitled Vehicle Suspension.

In this embodiment of the invention, a shock absorber 12' is carried within a fluid tight outer casing 14, and is closed at its upper end by a closure member 202 and closed at its lower end by the modified sealing means 101'.

The outer casing 14 thereby defines a closed air chamber 204 and is selectively secured by a conventional tire valve 206 joined thereto. Compressed air carried within the chamber 204 thereby provides a preloading of the shock absorber 12' as fully described in my aforesaid application Serial No. 190,106. The shock absorber 12' includes a tube 40 having a spaced apart concentric tube 208 operatively joined thereto to define a fluid accumulator chamber 210.

A rod 74 is secured at its upper end to the closure member 202 which carries a valved piston 60 at its opposite end, as shown in FIGURE 2. The rod 74 has a transverse passage 212 communicating with the valve piston 60 generally as shown in FIGURE 2 except, of course, the passage 212 communicated with the interior chamber of the tube 40. Carried about the upper end of the tube 40 is concentric outer tube 208, and a sealing member 214 joins these tubes together at their respective upper ends. The sealing member 214 carries packing (not shown) and has ports 216 providing communication between the interior of the tube 40 and the accumulator chamber 210 via the space between the exterior surface of the rod 74 and the sealing member 214. At the opposite end of the tubes 40 and 208 is a two-way valve assembly 218 having ports 220 which provide a similar communication with the accumulator chamber 210. An end cap 222 carries the valve 218 and likewise rigidly seals the lower ends of the tubes 40 and 208 in proper concentric relationship.

The valves 214 and 218 are in themselves known in the art, are likewise described in detail in my application Serial No. 850,957 now Patent No. 3,083,026. The barrel 28' is secured to the lower free end of the outer casing 14 and concentrically surrounds the outer tube 208. In this embodiment of the invention, the requirement for the tube 32 and the resilient sleeve diaphragm 16 is obviated, the barrel 28' carrying an integrally formed shoulder 34' to receive the spring 104 and the packing 106.

The operation of this embodiment of the invention is as follows: the shock absorber 12 carries hydraulic fluid while the air chamber 204 is filled by compressed air or the like through the tire valve 206. As the shock absorber 12 moves upwardly along the rod 74 towards the closure cap 202, the excessive hydraulic pressure in the lower chamber portion of the tube 40 below the piston 60 escapes into the upper chamber above the piston 60 by appropriate deflection of the carrier 82 and by outward flow through the valve 218—the hydraulic fluid moving into the accumulator chamber 210. Conversely, as the shock absorber 12 moves downwardly excessive pressure above the valve piston 60 causes the fluid to escape through the center passage 74 (FIGURE 2) upon downward movement of the valve member 70 against the action of the spring 68. Likewise, hydraulic fluid escapes through the ports 216 into the accumulator chamber 210 and hydraulic fluid flows back into the lower chamber below the ports 220 and the valve 218.

This operation is likewise well known in the art, being described in detail in my application Serial No. 190,106. According to the present invention, however, the sealing means 101' effectively maintains a fluid tight pressure seal within the air chamber 204.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. A hydro-pneumatic strut for connection to the sprung and unsprung masses of a vehicle comprising:
    (1) a pump damper assembly including:
        (a) a cylinder,
        (b) a piston rod extending through one end of said cylinder,
        (c) a piston within said cylinder and joined to said piston rod, said piston having passage means communicating with opposed portions of said cylinder defined thereby,
    (2) an outer casing having opposed closed and open ends positioned in surrounding, spaced apart relationship to said cylinder, the closed end thereof being operatively joined to said piston rod,
    (3) and means providing a fluid-tight seal between said pump damper cylinder and said outer casing while allowing relative longitudinal movement therebetween including:
        (a) barrel means joined to the open end of said outer casing in surrounding relationship to said pump damper cylinder,
        (b) compression spring means carried by said barrel means adjacent said pump damper cylinder, and,
        (c) packing means carried by said barrel means about said pump damper cylinder, and in engagement with said compression spring.

2. The strut defined in claim 1 including a resilient sleeve carried in spaced apart relationship to the interior surface of said outer casing; means sealing one end of said sleeve adjacent the closed end of said casing; and means operatively joining the opposite end thereof to said barrel means, whereby a fluid tight annular chamber is provided.

3. The strut defined in claim 1 including a closure cap carried by said barrel means to maintain said packing means in compressive engagement with said spring means.

4. The strut defined in claim 1 wherein said packing means includes nested, chevron packing rings.

5. The strut defined in claim 4 wherein said chevron packing rings are composed of polytetrafluoroethylene.

6. A hydro-pneumatic strut for connection to the sprung and unsprung mass of a vehicle comprising:
    (1) a pump damper assembly including:
        (a) a cylinder,
        (b) a piston rod extending through one end of said cylinder,
        (c) a piston within said cylinder and joined to said piston rod, said piston having passage means communicating with opposed portions of said cylinder defined thereby,
    (2) an outer casing having opposed closed and open ends positioned in surrounding, spaced apart relationship to said cylinder, the closed end thereof being operatively joined to said piston rod,
    (3) a resilient sleeve positioned between the interior surface of said outer casing and said pump damper cylinder, defining an annular fluid chamber,
    (4) means joining one end of said resilient sleeve to the closed end of said outer casing,
    (5) a tube positioned between said pump damper cylinder and said resilient sleeve,
    (6) a barrel joined to the open end of said outer casing in surrounding relationship to said pump damper assembly, said barrel having an exteriorly threaded free end, said resilient sleeve being positioned adjacent the interior surface of said barrel,
    (7) said tube having an enlarged bore in gripping engagement with said resilient sleeve, and
    (8) fluid tight sealing means carried within said enlarged bore of said tube including:
        (a) a compression spring mounted therein,
        (b) packing rings carried in said enlarged bore in engagement with said spring, and,
        (c) a centrally apertured interiorly threaded cap engaged to the exterior threads of said barrel to provide a compressive engagement of said packing rings adjacent the exterior surface of said pump damper cylinder.

7. The strut assembly defined in claim 6, wherein said tube is joined at one end to the closed end of said outer casing, said tube having slot means adjacent the closed end of said outer casing; said pump damper piston rod having a longitudinal passage communicating with the interior of said pump damper cylinder, and having transverse passage means adjacent the closed end of said outer casing, whereby communication is provided between the interior of said pump damper cylinder and said resilient sleeve.

References Cited in the file of this patent

UNITED STATES PATENTS

| 2,231,332 | Griepenstroh | Feb. 11, 1941 |
| 2,705,177 | Waring | Mar. 29, 1955 |

FOREIGN PATENTS

| 1,043,102 | Germany | Nov. 6, 1958 |